(12) United States Patent
Huang

(10) Patent No.: US 8,243,192 B2
(45) Date of Patent: Aug. 14, 2012

(54) ELECTRONIC DEVICE HAVING LIGHT SOURCE

(75) Inventor: Shan-Fu Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 191 days.

(21) Appl. No.: 12/764,913

(22) Filed: Apr. 21, 2010

(65) Prior Publication Data

US 2011/0037891 A1  Feb. 17, 2011

(30) Foreign Application Priority Data

Aug. 14, 2009  (CN) .......................... 2009 1 0305655

(51) Int. Cl.
*H04N 5/222* (2006.01)
*H04N 5/225* (2006.01)

(52) U.S. Cl. ....................................... 348/371; 348/374

(58) Field of Classification Search .................. 348/370, 348/371, 374; 362/245, 16, 17, 18; 396/179, 396/171, 176, 175
See application file for complete search history.

(56) References Cited

U.S. PATENT DOCUMENTS

| | | | | |
|---|---|---|---|---|
| 6,078,752 | A * | 6/2000 | Tenmyo | 396/176 |
| 6,381,415 | B1 * | 4/2002 | Terada | 396/176 |
| 2006/0203121 | A1 * | 9/2006 | Kojima | 348/370 |
| 2007/0263120 | A1 * | 11/2007 | Ho | 348/371 |

* cited by examiner

*Primary Examiner* — Tuan Ho
*Assistant Examiner* — Shahbaz Nazrul
(74) *Attorney, Agent, or Firm* — Altis Law Group, Inc.

(57) ABSTRACT

An electronic device includes a body, a camera module, a light source, and a lens. The body includes an upper surface defining a blind hole and a primary recess communicated with the blind hole. The camera module is embedded in the upper surface of the body near the blind hole. The light source is received in the blind hole with has a light emitting surface. The light emitting surface faces the entrance of the blind hole. The lens is movably received in the recess. The lens is capable of partly sliding out from the recess to cover the light emitting surface of the light source.

16 Claims, 12 Drawing Sheets

ELECTRONIC DEVICE HAVING LIGHT SOURCE

BACKGROUND

1. Technical Field

The present disclosure relates to electronic devices, particularly relates to an electronic device having a light source.

2. Description of Related Art

Nowadays, portable electronic devices with multiple functions such as mobile phones, or personal digital assistants are widely used. A portable electronic device generally includes a camera module and a light source. However, the light source can only be used for a flash lamp of the camera module.

Therefore, a new electronic device is desired to overcome the above-described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various disclosed embodiments of the present disclosure in detail, wherein like numerals refer to like elements throughout.

Figure 1:
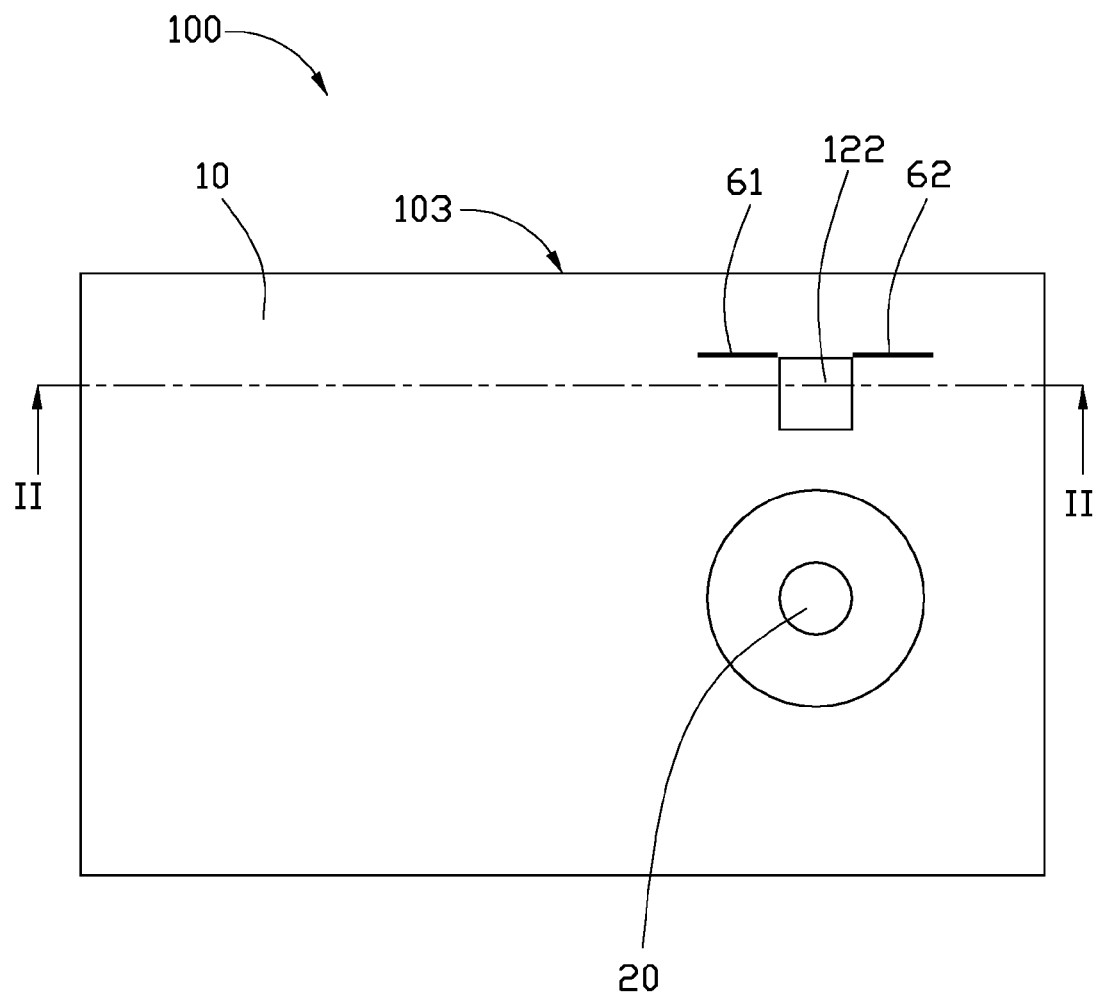
FIG. 1 is a top view of an electronic device according to a first embodiment.
Figure 2:
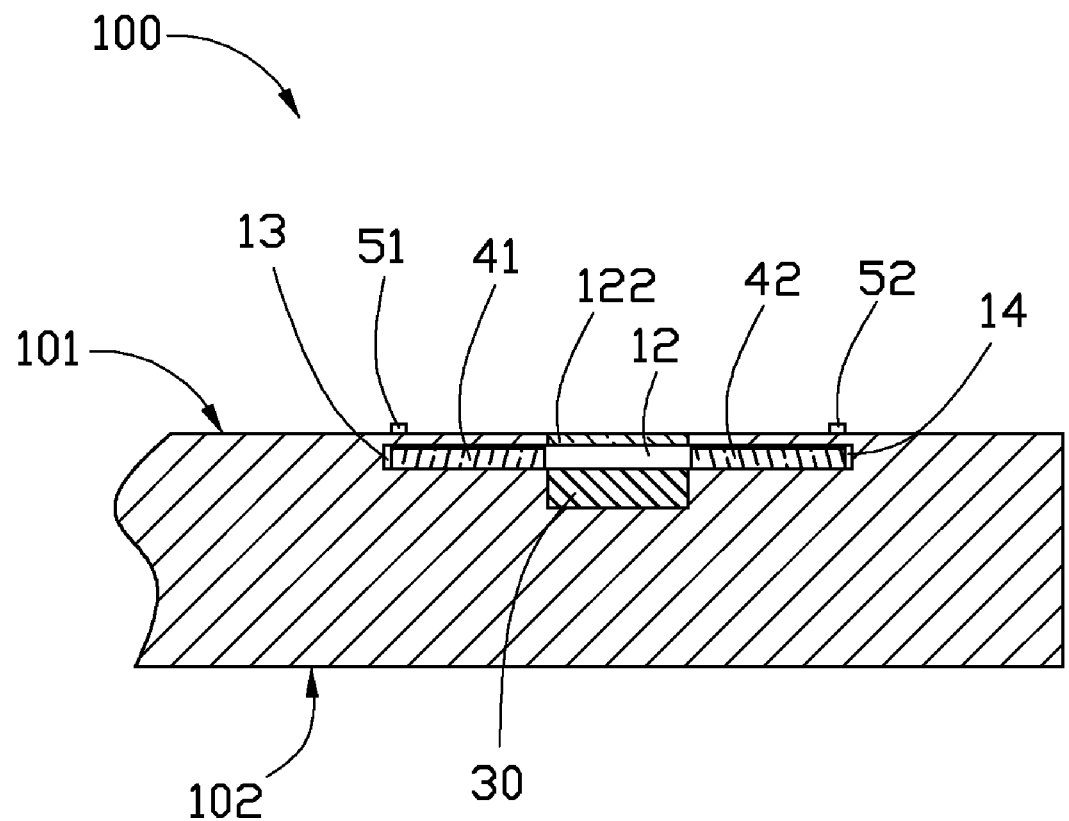
FIG. 2 is an enlarged cross-sectional view of a portion of the electronic device of FIG. 1, taken along line II-II.

Referring to FIGS. 1 to 2, an electronic device 100 according to a first embodiment of the present disclosure is shown. The electronic device 100 includes a body 10, a camera module 20, a light source 30, a first lens 41, and a second lens 42.

The body 10 includes an upper surface 101, a lower surface 102 opposite to the upper surface 101, and a side surface 103 perpendicularly connecting with the upper surface 101 and the lower surface 102. In one embodiment, the upper surface 101 is substantially parallel to the lower surface 102.

The camera module 20 is embedded in the upper surface 101. An optical axis of the camera module 20 is substantially perpendicular to the upper surface 101 and an object lens of the camera module 20 is exposed from the upper surface 101.

The body 10 defines a blind hole 12 in the upper surface 101 near the camera module 20. The blind hole 12 extends from the upper surface 101 towards the lower surface 102. The body 10 further defines a first recess 13 and a second recess 14 at opposite sides of the blind hole 12. The first recess 13 and the second recess 14 are communicated with the blind hole 12 with their entrances formed on the side surfaces of the blind hole 12. Each of the first and the second recesses 13 and 14 extends perpendicular to the blind hole 12 and parallel to the upper surface 101. In one embodiment, the blind hole 12, the first recess 13 and the second recess 14 are square shaped and each of the first recess 13 and the second recess 14 is slightly wider than the entrance of the blind hole 12.

The light source 30 is mounted on a bottom surface of the blind hole 12 and is totally received in the blind hole 12. A light emitting surface of the light source 30 far from the bottom surface of the blind hole 12 faces the entrance of the blind hole 12. As shown in FIG. 2, the light emitting surface of the light source 30 is lower than the first recess 13 and a second recess 14. When environment is dark or dim, the light source 30 is used to illuminate the object for the camera 20 to take pictures or illuminate the environment like a torch. In one embodiment, the light source 30 includes a light emitting diode (LED).

The first lens 41 and the second lens 42 have different optical configurations and are used for different purposes. The first lens 41 is movably received in the first recess 13, and most portions of the first lens 41 can slide out of the first recess 13 to cover the light emitting surface of the light source 30. Similarly, the second lens 42 is movably received the second recess 14, and most portions of the second lens 42 can slide out of the second recess 14 to cover the light emitting surface of the light source 30. Thus, light emitted from the light source 30 can be selected to be refracted by the first lens 41 or the second lens 42, thereby achieving different purposes.

Figure 3:
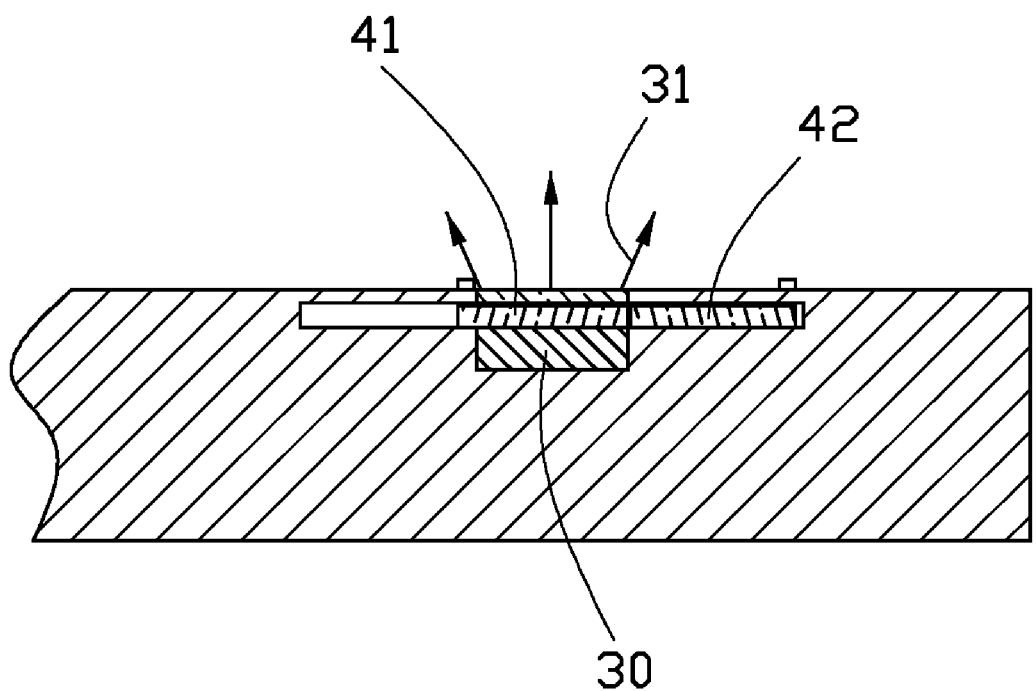
FIGS. 3 and 4 are enlarged cross-sectional views of a portion of the electronic device of FIG. 1 according to different use states.

In one embodiment, the body 10 defines a first slit 61 and a second slit 62 in the upper surface 101 spatially corresponding to the first and the second recesses 13 and 14. The first slit 61 and the second slit 62 are arranged in a row and communicate with the first recess 13 and the second recess 14, respectively. A first push pole 51 is formed on an end of the first lens 41 far from the blind hole 12. The first push pole 51 extends from the first lens 41 to pass through the first slit 61 and protrude from the upper surface 101 of the body 100. A second push pole 52 is formed on an end of the second lens 42 far from the blind hole 12. The second push pole 52 extends from the second lens 42 to pass through the first slit 62 and protrude from the upper surface 101 of the body 100. That is, as shown in FIGS. 2 to 3, top surfaces of the first and the second push poles 51 and 52 are higher than the upper surface 101 of the body 100. The first lens 41 can be moved back and forth by pulling the first push pole 51 along the first slit 61. The second lens 42 can be moved back and forth by pulling the second push pole 52 along the second slit 62.

In alternative embodiment, the first slit 61 and the second slit 62 are defined in the side surface 103 of the body. The first push pole 51 extends from a side of the first lens 41 to pass through the first slit 61 and protrude from the side surface 103 of the body 100. The second push pole 52 extends from a side of the second lens 42 to pass through the second slit 62 and protrude from the side surface 103 of the body 100. A step motor can be provided in the body 10 to automatically move the first lens 41 and the second lens 42 to cover the light source 30 in the blind hole 12.

Figure 4:
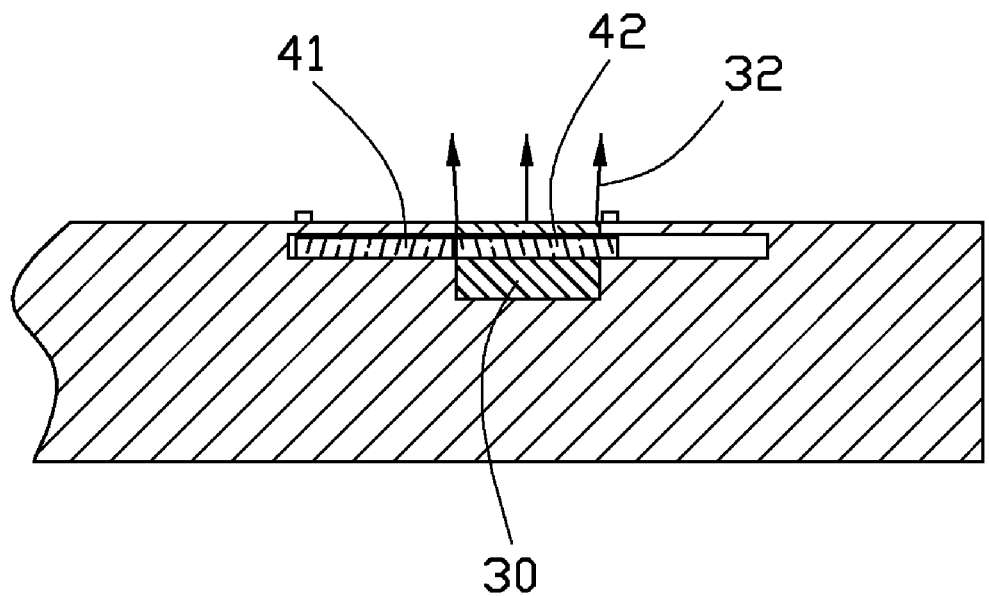

Referring to FIGS. 3 to 4, in one embodiment, the first lens 41 is a diffusing lens, such as a concave lens having scattering surface, for diffusing the light 31 emitting from the light source 30 to a predetermined angle. The second lens 42 is a contract lens, such as a convex lens, for focusing the light 32 emitting from the light source 30 like a torch. Therefore, the light source 30 can be selected to function as a flashlight or a torch when one of the first lens 41 and the second lens 42 is selected to cover the light emitting surface of the light source 30.

In one embodiment, a transparent cover 122, such as transparent glass panel or plastic panel, is provided to seal the blind hole 102 to protect the light source 30 and the first lens 41 or the second lens 42.

Figure 5:
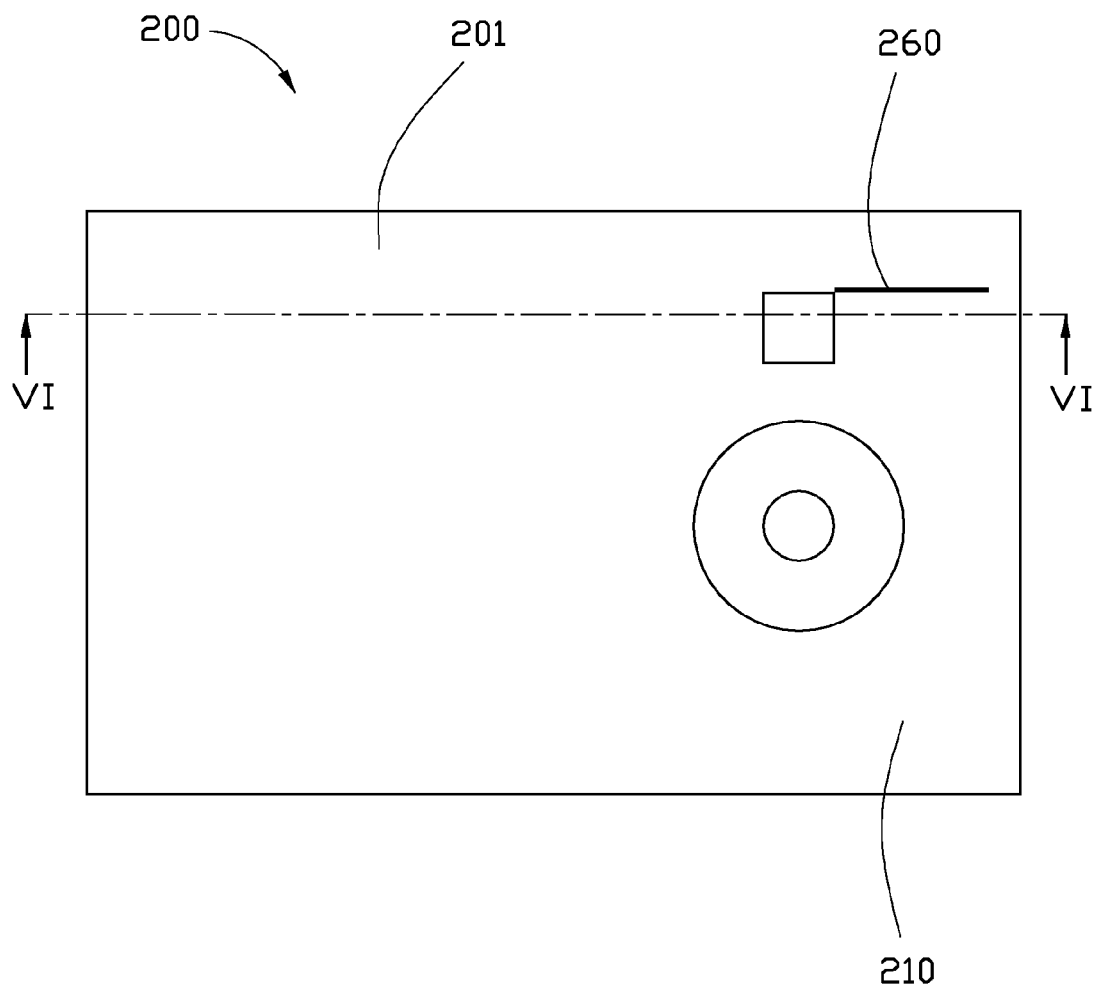
FIG. 5 is a top view of an electronic device according to a second embodiment.
Figure 6:
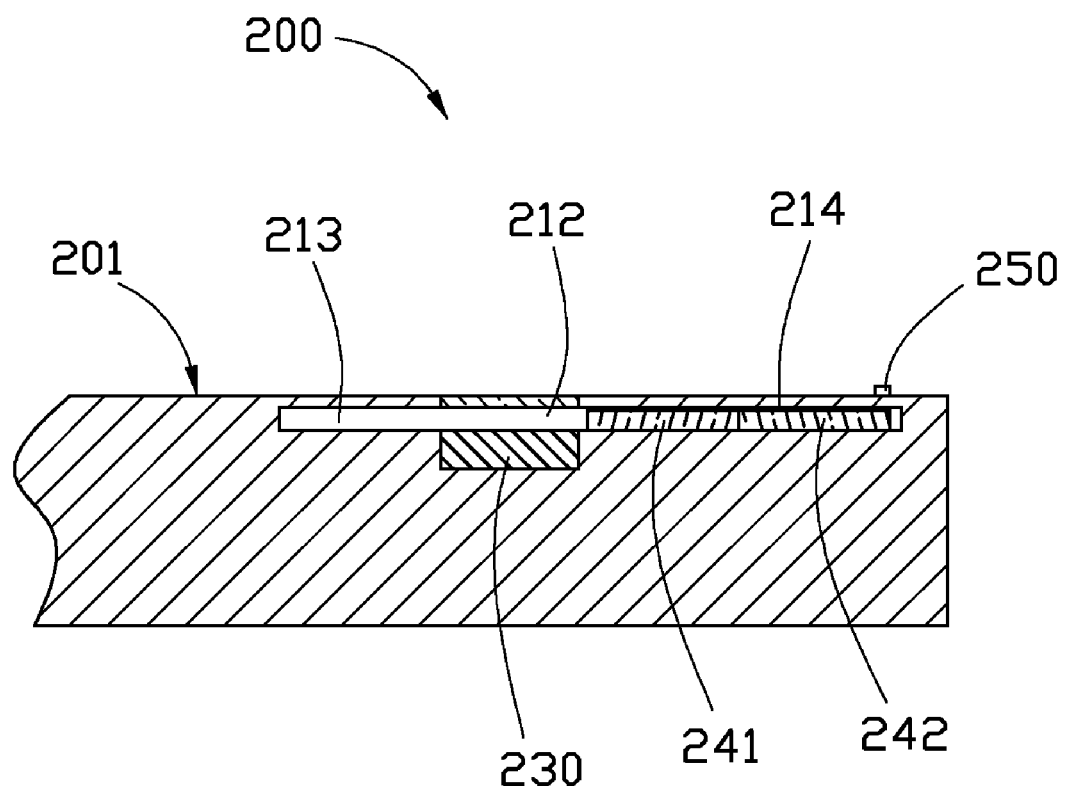
FIG. 6 is an enlarged cross-sectional view of a portion of the electronic device of FIG. 5, taken along line VI-VI.

Referring to FIGS. 5 to 6, an electronic device 200 according to a second embodiment of the present disclosure is shown. The electronic device 200 differs from the electronic device 100 of the first embodiment only in that first lens 241 and second lens 242 are two portions of one lens. First recess 213 is capable of receiving only the first lens 241. Second recess 214 is capable of receiving both the first lens 241 and the second lens 242. When the first lens 241 and the second lens 242 are received in the second recess 214, the first lens 241 is adjacent to the blind hole 212 and the second lens 242 is away from the blind hole 212. The body 210 defines a slit 260 in the upper surface 201 communicating with the second recess 214. A push pole 250 is formed on the second lens 242 far from the first lens 241 for pulling the first and the second lenses 241 and 242. The push pole 250 extends from the second lens 242 to pass through the slit 260 and protrude from the upper surface 201 of the body 200.

Similarly, the push pole 250 received in the first and second recesses 213 and 214 can move the first lens 241 and the second lens 242. Thus, one of the first lens 241 and the second lens 242 can be selected to cover the light source 230. Therefore, the light source 230 can be selected to function as a flashlight or a torch.

Figure 7:
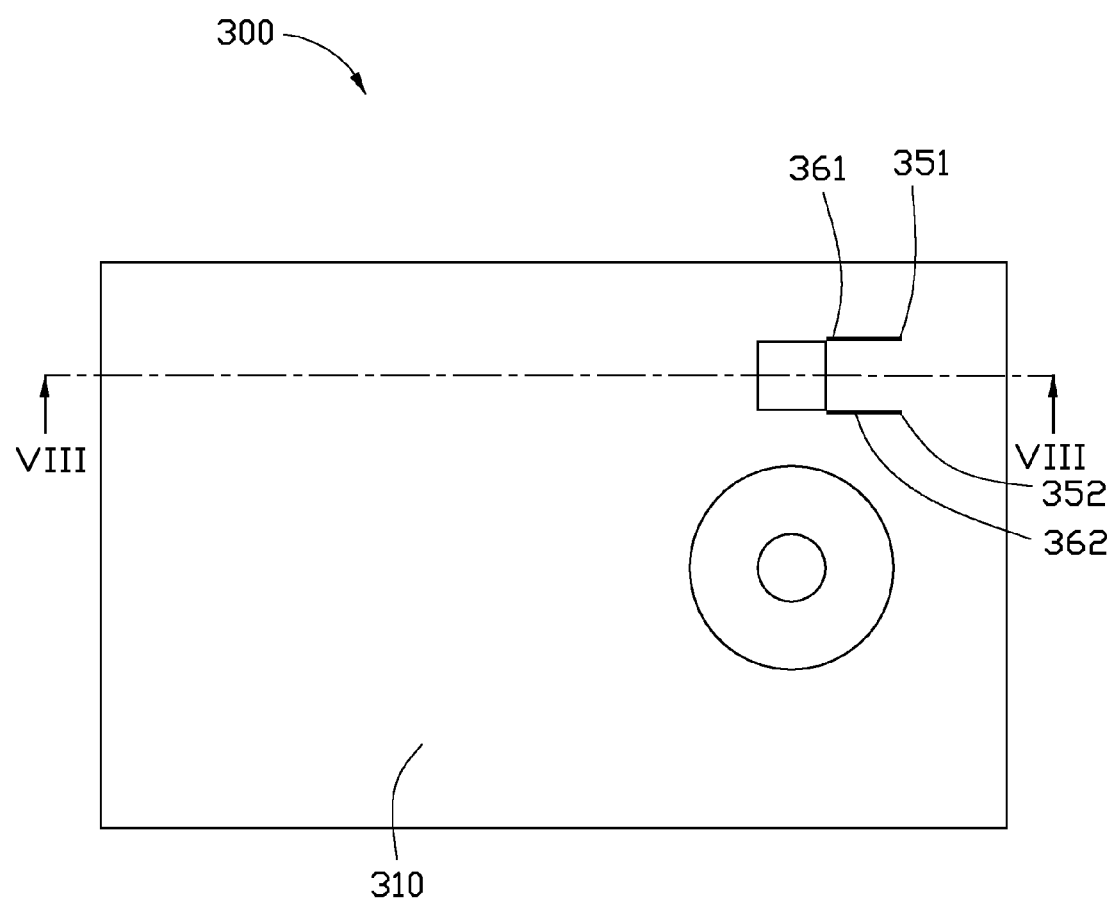
FIG. 7 is a top view of an electronic device according to a third embodiment.
Figure 8:
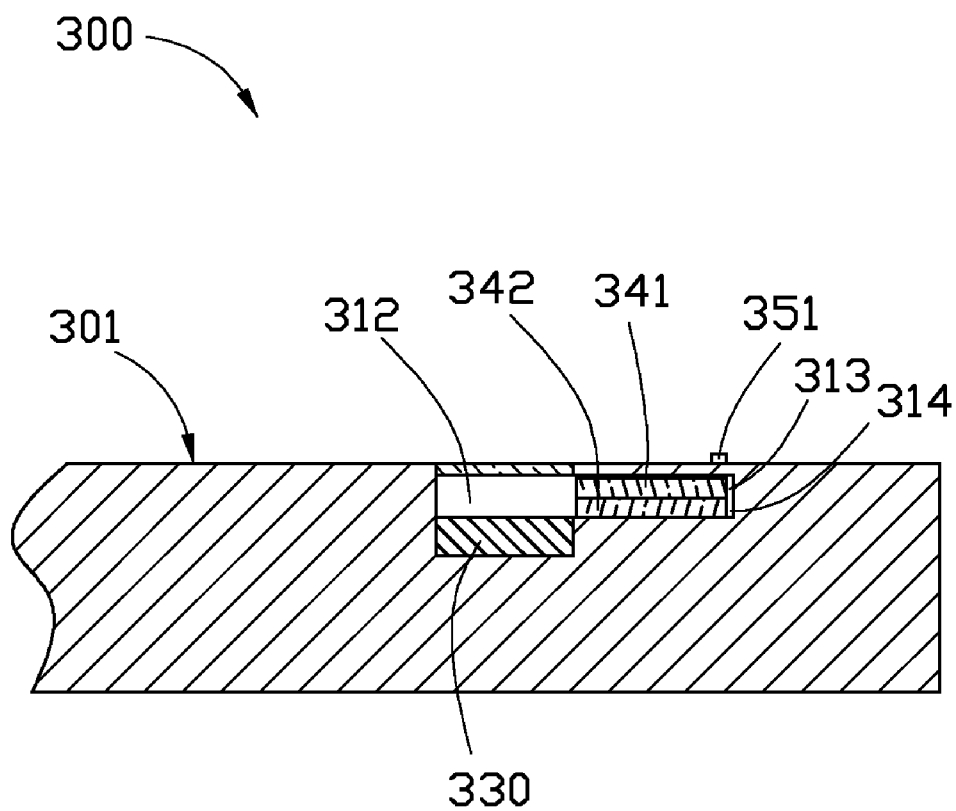
FIG. 8 is an enlarged cross-sectional view of a portion of the electronic device of FIG. 8, taken along line VIII-VIII.

Referring to FIGS. 7 to 8, an electronic device 300 according to a third embodiment of the present disclosure is shown. The electronic device 300 differs from the electronic device 100 only in that first recess 313 and second recess 314 are positioned at a same side of blind hole 312 and overlapped with each other. First lens 341 and second lens 342 are received in the first recess 313 and the second recess and 314, respectively. In one embodiment, as shown in FIG. 8, the first lens 341 is higher than the second lens 342 or positioned over the second lens 342. The body 310 defines a first slit 361 communicated with the first recess 313 and a second slit 362 communicated with the second recess 314. In this embodiment, the first slit 361 and the second slit 362 are positioned at opposite sides of the first recess 313 or the second recess 314. A first push pole 351 extends from the first lens 341 to protrude from first surface 301. A second push pole 352 opposite to the first push pole 351 extends from the first lens 341 to protrude from the first surface 301. Similarly, the first push pole 351 and the second push pole 352 can selectively move the first lens 341 and the second lens 342.

Figure 9:
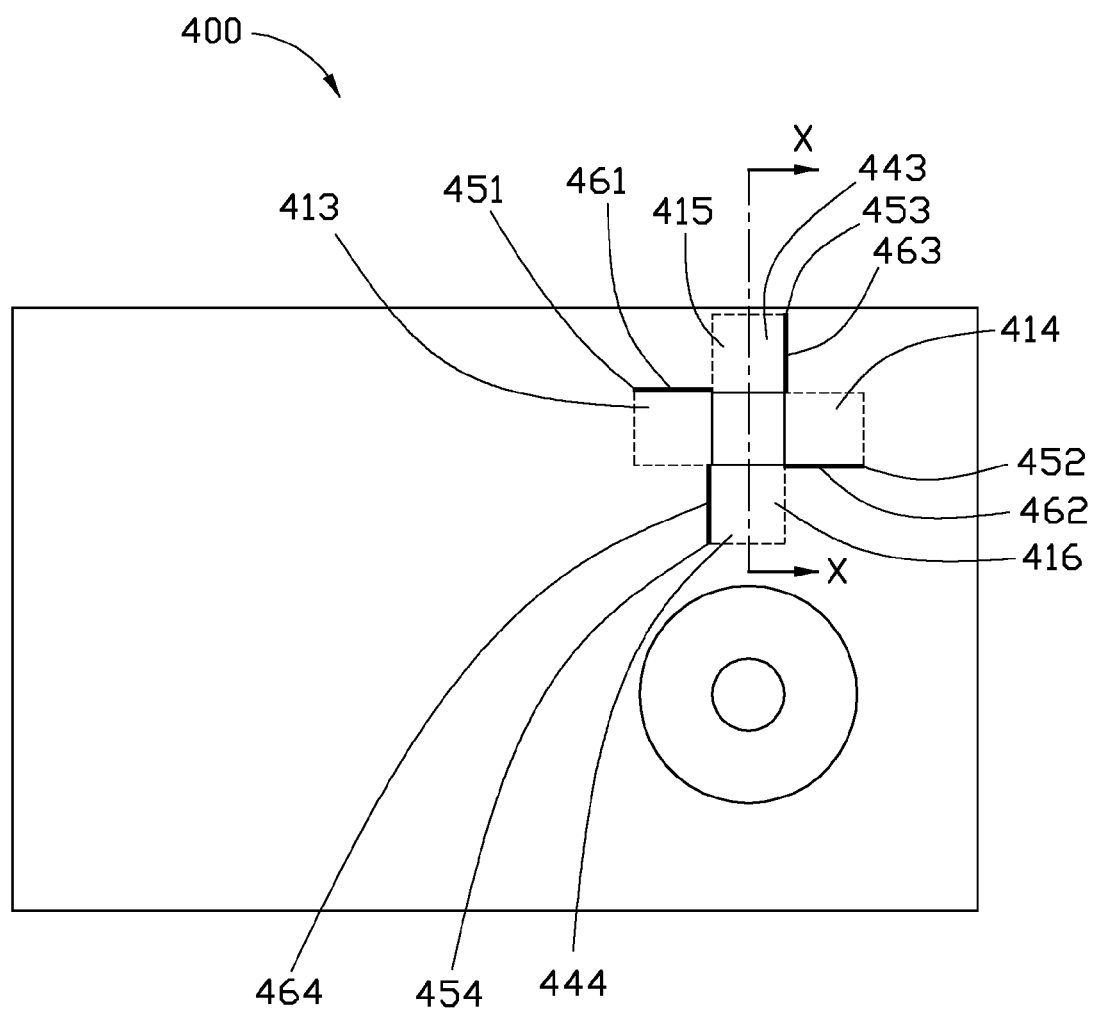
FIG. 9 is a top view of an electronic device according to a fourth embodiment.
Figure 10:
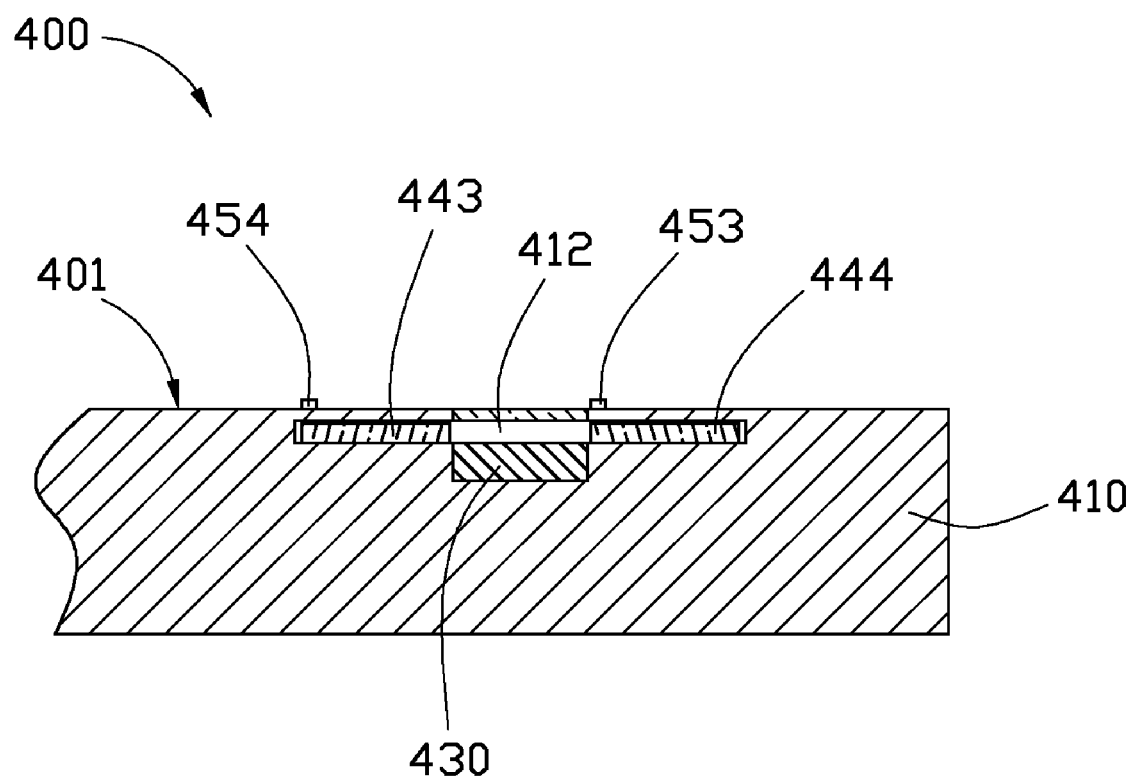
FIG. 10 is an enlarged cross-sectional view of a portion of the electronic device of FIG. 9, taken along line X-X.

Referring to FIGS. 9 to 10, an electronic device 400 according to a fourth embodiment of the present disclosure is shown. The electronic device 400 differs from the electronic device 100 only in that its body 410 includes a third recess 415, a fourth recess 416, a third lens 443, a fourth lens 444, a third push pole 451, and a fourth push pole 452.

The third recess 415 and the fourth recess 416 are similar to the first recess 13 and the second recess 14 of the electronic device 100 but are rotated around the blind hole 412 at 90 degrees. Therefore, the first, second, third and fourth recesses 413, 414, 415, and 416 are symmetrically arranged around the blind hole 12 and adjacent to four sides of the blind hole 412, respectively. The body 410 further defines first, second, third, and fourth slits 461, 462, 463, and 464 in the first surface 401 radially around the blind hole 412. The first, second, third, and fourth slits 461, 462, 463, and 464 communicate with the first, second, third and fourth recesses 413, 414, 415, and 416, respectively. The third and fourth push poles 453 and 454 extend respectively from the third and fourth lenses 443 and 444 to pass through the third and fourth slits 463 and 464, thereby protruding from the first surface 401. As shown in FIG. 10, the top surfaces of the third and fourth push poles 453 and 454 are higher than the first surface 401. Similarly, the third and fourth push poles 453 and 454 can be pulled along the third and fourth slits 463 and 464 correspondingly moving the third lens 443 and the fourth lens 444. Therefore, one of the third and fourth lenses 443 and 444 can be selected to cover the light source 430.

Figure 11:
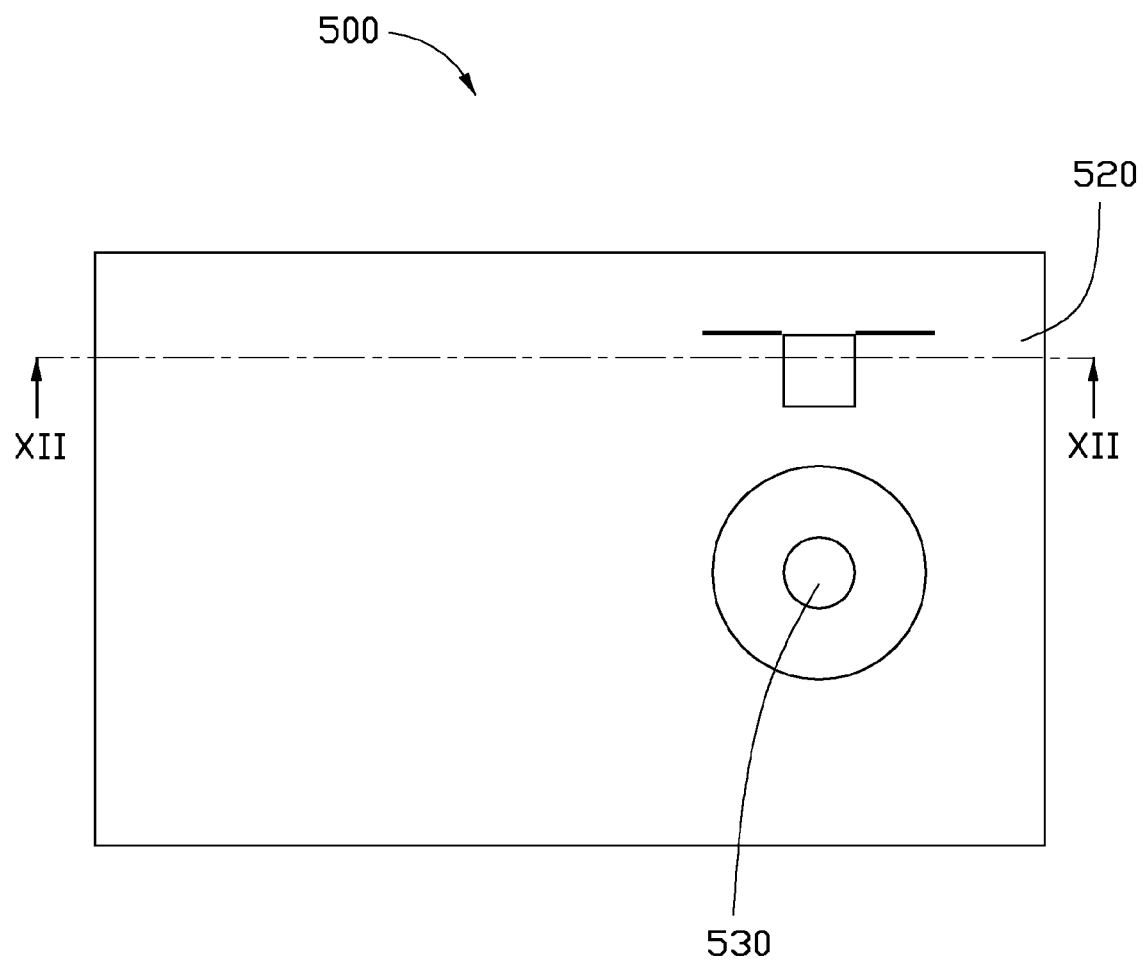
FIG. 11 is a top view of an electronic device according to a fifth embodiment.
Figure 12:
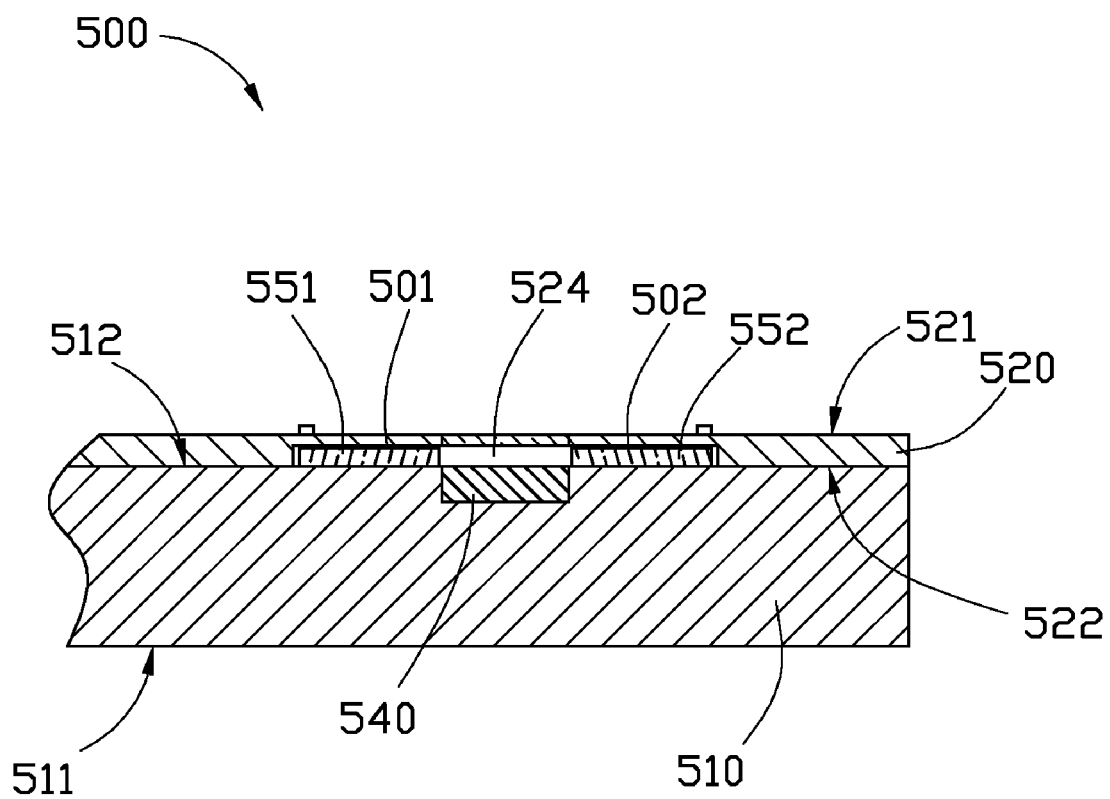
FIG. 12 is an enlarged cross-sectional view of a portion of the electronic device of FIG. 9, taken along line XII-XII.

Referring to FIGS. 11 to 12, an electronic device 500 according to a fifth embodiment of the present disclosure is shown. The electronic device 500 includes a first substrate 510, a second substrate 520, a camera module 530, and a light source 540 near the camera module 530, a first lens 551, and a second lens 552.

The first substrate 510 includes a lower surface 511 and an upper surface 512 opposite to the lower surface 511. The second substrate 520 includes a top surface 521 and a bottom surface 522 opposite to the top surface 521. The bottom surface 522 of the second substrate 520 is attached to and is fixed with the upper surface 512 of the first substrate 510.

The camera module 530 is embedded in the first and the second substrates 510 and 520 with its object lens exposed from the top surface 521 of the second substrate 520.

As shown in FIG. 12, the light source 540 is embedded in the upper surface 512 of the first substrate 510 with its light emitting surface exposed therefrom. In one embodiment, the light emitting surface of the light source 540 is substantially parallel to the upper surface 512 of the first substrate 510. Alternatively, the light emitting surface of the light source 540 is lower than the upper surface 512 of the first substrate 510.

The second substrate 520 defines a through hole 524, a first recess 501 and a second recess 502. The first recess 501 and the second recess 502 are located on opposite sides of the through hole 524 and communicate with the through hole 524. The second substrate 520 further defines two slits in the top surface 521 spatially corresponding to the first and the second recesses 501 and 502.

The first and the second lenses 551 and 552 are respectively received in the first and the second recesses 501 and 502. Each of the first and second lenses 551 and 552 includes a push pole protruding from the top surface 521 of the first substrate 520 via the corresponding slit.

The first lens 551 and the second lens 552 can be moved over the upper surface 512 of the first substrate 510 by pulling the push poles along the two slits, correspondingly. Therefore, the first and the second lens 551 and 552 can be selected to cover the light source 540 to change functions of the light source 540.

It is to be understood, however, that even though numerous characteristics and advantages of certain inventive embodiments have been set out in the foregoing description, together with details of the structures and functions of the embodiments. The present disclosure is illustrative only; and that changes may be made in detail, especially in matters of arrangement of parts within the principles of the present disclosure to the full extent indicated by the broad general meaning of the terms in which the appended claims are expressed.

What is claimed is:

1. An electronic device comprising:
a body comprising an upper surface, the body defining a blind hole and a recess in the upper surface, and the recess being communicated with the blind hole;
a camera module embedded in the upper surface of the body near the blind hole;
a light source received in the blind hole and having a light emitting surface, the light emitting surface facing the entrance of the blind hole;
a primary lens movably received in the recess to be capable of partly sliding out from the recess to cover the light emitting surface; and
a secondary lens movably received in the recess;
wherein the secondary lens overlaps the primary lens, and the primary lens and the secondary lens are selectively moved to cover the light source.

2. The electronic device of claim 1, wherein the light source is mounted on a bottom surface of the blind hole and totally received in the blind hole.

3. The electronic device of claim 1, wherein the light emitting surface is lower than the recess.

4. The electronic device of claim 1, wherein the primary lens is a concave lens having a scattering surface.

5. The electronic device of claim 1, wherein the primary lens is a convex lens.

6. The electronic device of claim 1, further comprising a transparent cover, the transparent cover sealing the blind hole and being configured to protect the light source and the primary lens.

7. The electronic device of claim 1, further comprising a push pole formed on the primary lens, the body further defining a slit in the upper surface communicated with the recess, and the push pole protruding from the upper surface of the body through the slit and being configured to be moved along the slit to move the primary lens.

8. The electronic device of claim 1, wherein the recess extends perpendicular to the blind hole.

9. The electronic device of claim 1, wherein the camera module comprises an object lens exposed from the upper surface.

10. The electronic device of claim 1, wherein the primary lens and the secondary lens have different optical configurations.

11. The electronic device of claim 10, wherein the primary lens and the secondary lens are a concave lens and a convex lens, respectively.

12. An electronic device comprising:
a body comprising an upper surface, the body defining a blind hole and a plurality of recesses in the upper surface, the recesses being communicated with the blind hole and positioned around the blind hole;
a camera module embedded in the upper surface of the body near the blind hole;
a light source received in the blind hole; and
a plurality of lenses, each of the lenses being movably received in a corresponding recess and capable of partly sliding out from the corresponding recess to cover the light source;
wherein the body further defines a plurality of slits in the upper surface, and each of the lenses comprises a push pole protruding from the upper surface of the body via a corresponding one of the slits.

13. The electronic device of claim 12, wherein the blind hole is square shaped, the plurality of recesses comprises four recesses adjacent four sides of the blind hole, and the plurality of lenses comprises four lenses.

14. An electronic device comprising:
a body comprising an upper surface, the body defining a blind hole, a first recess, a second recess and a first slit in the upper surface, the first slit corresponding to the first recess, the first recess and the second recess communicating with the blind hole at two opposite sides of the blind hole, and each of the first and the second recesses extending perpendicular to the blind hole and parallel to the upper surface;
a light source received in the blind hole and having a light emitting surface, the light emitting surface facing the entrance of the blind hole;
a first lens movably received in the first recess to be capable of partly sliding out from the first recess to cover the light emitting surface;
a second lens having different optical configurations from the first lens and connected to an opposite end of the first lens, the first lens and the second lens being selectively moved to cover the light source, wherein the second recess is capable of receiving only the second lens, the first recess is capable of receiving both the first lens and the second lens, and the second lens is adjacent to the blind hole and the first lens is away from the blind hole when the first lens and the second lens are both received in the first recess; and
a first push pole formed on one end of the first lens far from the blind hole, and extending from the first lens to pass through the first slit and protrude from the upper surface;
wherein the first push pole is configured to be moved along the first slit to slide both the first lens and the second lens along the first recess.

15. An electronic device comprising:
a body comprising an upper surface, the body defining a blind hole, a first recess, a second recess, a first slit and a second slit in the upper surface, the first slit corresponding to the first recess, the second slit corresponding to the second recess, the first recess and the second recess communicating with the blind hole at two opposite sides of the blind hole, and each of the first and the second recesses extending perpendicular to the blind hole and parallel to the upper surface;
a light source received in the blind hole and having a light emitting surface, the light emitting surface facing the entrance of the blind hole;
a first lens movably received in the first recess to be capable of partly sliding out from the first recess to cover the light emitting surface;
a first push pole formed on one end of the first lens far from the blind hole, and extending from the first lens to pass through the first slit and protrude from the upper surface, the first push pole configured to be moved along the first slit to slide the first lens along the first recess;
a second lens having different optical configurations from the first lens, the second lens being movably received in the second recess to be capable of partly sliding out from the second recess to cover the light emitting surface; and
a second push pole formed on one end of the second lens far from the blind hole, and extending from the second lens to pass through the second slit and protrude from the upper surface, the second push pole configured to be moved along the second slit to slide the second lens along the second recess;
wherein the first lens and the second lens are selectively moved to cover the light source.

16. An electronic device comprising:
a body comprising an upper surface, the body defining a blind hole, a first recess, a second recess and a first slit in the upper surface, the first slit corresponding to the first recess, the first recess and the second recess communicating with the blind hole at two opposite sides of the blind hole, and each of the first and the second recesses extending perpendicular to the blind hole and parallel to the upper surface;

a light source received in the blind hole and having a light emitting surface, the light emitting surface facing the entrance of the blind hole;

a first lens movably received in the first recess to be capable of partly sliding out from the first recess to cover the light emitting surface;

a first push pole formed on one end of the first lens far from the blind hole, and extending from the first lens to pass through the first slit and protrude from the upper surface, the first push pole configured to be moved along the first slit to slide the first lens along the first recess;

a second lens having different optical configurations from the first lens, the second lens being movably received in the second recess to be capable of partly sliding out from the second recess to cover the light emitting surface; and a second push pole formed on one end of the second lens far from the blind hole;

wherein the body further comprises a first substrate and a second substrate stacked on the first substrate, an upper surface of the second substrate is the upper surface of the body, the first substrate comprises a first surface parallel to the upper surface, the blind hole extends into the first substrate at the first surface, the second substrate comprises a second surface at a side of the second substrate opposite to a side of the second substrate having the upper surface, the second surface is attached to the first surface of the first substrate, and the first and second recesses are disposed in the second substrate at the second surface.

* * * * *